(12) United States Patent
Pedhazur et al.

(10) Patent No.: US 9,898,504 B1
(45) Date of Patent: Feb. 20, 2018

(54) SYSTEM, METHOD, AND COMPUTER PROGRAM FOR ACCESSING DATA ON A BIG DATA PLATFORM

(71) Applicant: Amdocs Software Systems Limited, Dublin (IE)

(72) Inventors: Nir Pedhazur, Petah Tikva (IL); Arnon Rotem-Gal-Oz, Haifa (IL); Oren Kafka, Kfar Saba (IL); Zohar Gofer, Pardes Hana-Karkur (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 431 days.

(21) Appl. No.: 14/520,249

(22) Filed: Oct. 21, 2014

(51) Int. Cl.
*G06F 17/30* (2006.01)

(52) U.S. Cl.
CPC ............... *G06F 17/30427* (2013.01)

(58) Field of Classification Search
CPC .................................................. G06F 17/30427
See application file for complete search history.

(56) References Cited

U.S. PATENT DOCUMENTS

| | | | |
|---|---|---|---|
| 7,734,581 B2 * | 6/2010 | Gu | G06F 17/30315 707/610 |
| 2008/0059408 A1 * | 3/2008 | Barsness | G06F 17/30545 |
| 2009/0299959 A1 * | 12/2009 | Ostrovsky | G06F 17/30471 |
| 2012/0150819 A1 * | 6/2012 | Lindahl | G06F 17/30536 707/687 |
| 2014/0280034 A1 * | 9/2014 | Harris | G06F 17/30451 707/718 |
| 2015/0178363 A1 * | 6/2015 | Spyker | G06F 9/466 707/633 |

* cited by examiner

*Primary Examiner* — Jorge A Casanova
(74) *Attorney, Agent, or Firm* — Zilka-Kotab, PC

(57) ABSTRACT

A system, method, and computer program product are provided for accessing data on a big data platform. In use, a request associated with a data processing job to process data stored in a big data store is identified, the data being stored in a plurality of rows with each row being associated with a unique key. Additionally, a data processing job input associated with the request is received, the data processing job input including a set of keys required to be read for processing. Further, the set of keys is translated into one or more queries, the one or more queries including at least one of a request to read an individual key or a request to read a range of keys. Moreover, the data is loaded from the big data store based on the one or more queries.

11 Claims, 4 Drawing Sheets

SYSTEM, METHOD, AND COMPUTER PROGRAM FOR ACCESSING DATA ON A BIG DATA PLATFORM

FIELD OF THE INVENTION

The present invention relates to big data platforms and more particularly to accessing data on such platforms.

BACKGROUND

To reduce cost, big data infrastructure (e.g. such as Hadoop, etc.) is typically configured to run over large sets of spinning hard drives directly connected to a large number of hosts. As data typically cannot fit into a host memory and needs to be read and written to a disk, extensive I/O operations are required in order to fetch data associated with a job.

As random access reads and writes are an expensive process, it is preferable to perform sequential access to disks from both reading and writing purposes. Typically, focusing on pure sequential I/O prevents systems from performing fine grained operations such as performing updates to individual records as part of a batch process.

There is thus a need for addressing these and/or other issues associated with the prior art.

SUMMARY

A system, method, and computer program product are provided for accessing data on a big data platform. In use, a request associated with a data processing job to process data stored in a big data store is identified, the data being stored in a plurality of rows with each row being associated with a unique key. Additionally, a data processing job input associated with the request is received, the data processing job input including a set of keys required to be read for processing. Further, the set of keys is translated into one or more queries, the one or more queries including at least one of a request to read an individual key or a request to read a range of keys. In addition, redundant rows are filtered out when the one or more queries include the request to read a range of keys. Moreover, the data is loaded from the big data store based on the one or more queries.

DETAILED DESCRIPTION

Figure 1:
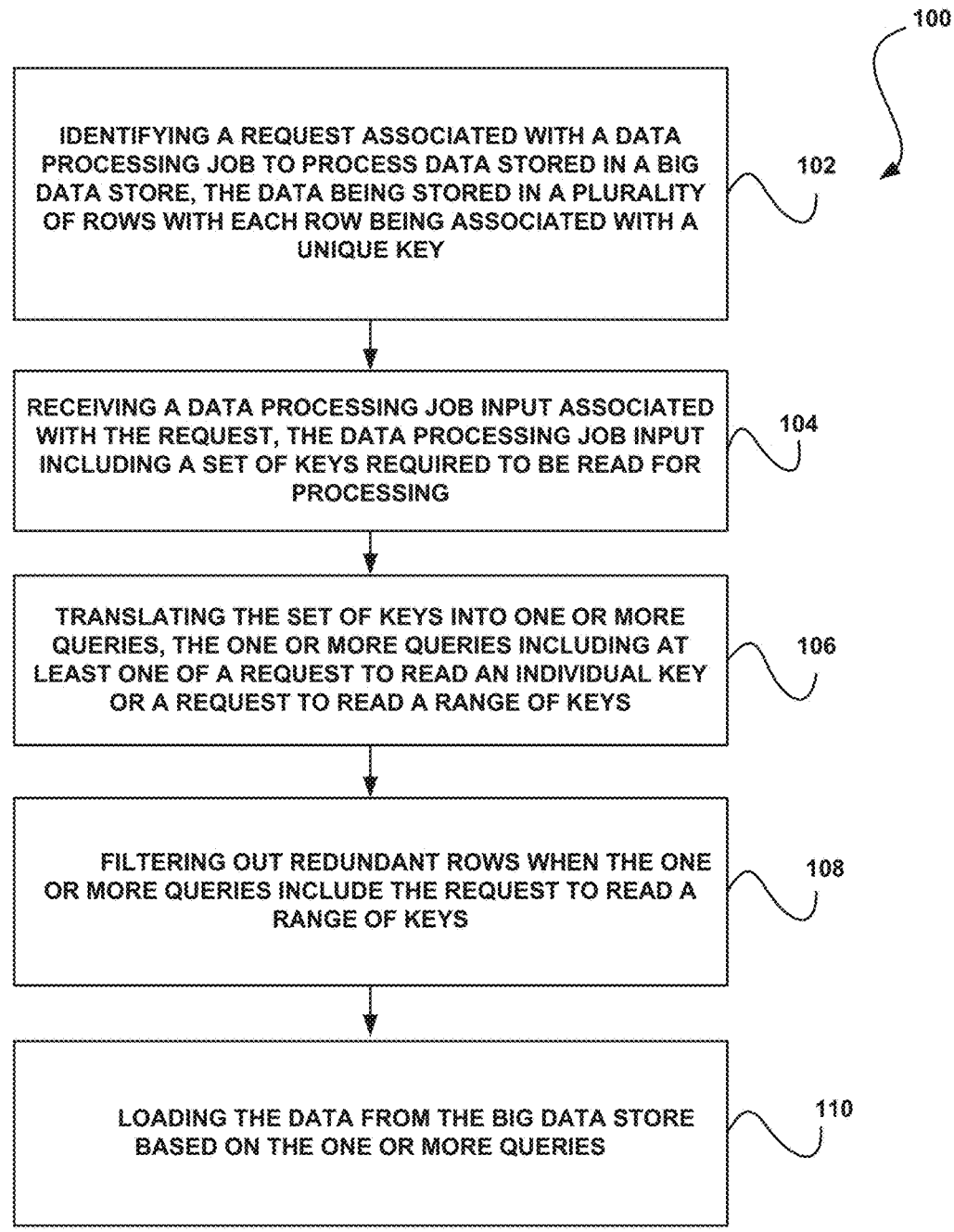
FIG. 1 illustrates a method for accessing data on a big data platform, in accordance with one embodiment.

FIG. 1 illustrates a method 100 for accessing data on a big data platform, in accordance with one embodiment.

As shown, a request associated with a data processing job to process data stored in a big data store is identified, the data being stored in a plurality of rows with each row being associated with a unique key. See operation 102. The big data store may include any combination of one or more memory systems associated with a variety of hosts.

For example, the big data store may include a plurality of hard drives directly connected to a plurality of host systems (e.g. accessible over a network, etc.). Additionally, the data in the big data store may include rows of data that are stored on one or more disks sorted by an associated unique key with adjacent rows placed on common physical disk blocks. Further, the big data store may support both key based random access to individual rows and range based retrieval of rows given a start row key and an end row key.

As shown further in FIG. 1, a data processing job input associated with the request is received, the data processing job input including a set of keys required to be read for processing. See operation 104. In one embodiment, the data processing job input may be received as part of the request to access data.

Further, the set of keys is translated into one or more queries, the one or more queries including at least one of a request to read an individual key or a request to read a range of keys. See operation 106. In addition, redundant rows are filtered out when the one or more queries include the request to read a range of keys. See operation 108.

Moreover, the data is loaded from the big data store based on the one or more queries. See operation 110.

Translating an input data set into a set of queries may be based on various techniques in order to balance between the amount of data being loaded and the efficiency gained by performing sequential IO operation versus random access to physical disks. For example, in one embodiment, when the number of input rows identified in the data processing job input is less than a predefined threshold (e.g. a user defined threshold, etc.) the set of keys may be translated into a request to read one or more individual keys. In this case, loading the data from the big data store based on the one or more queries may include performing individual random access.

As another example, when the number of input rows identified in the data processing job input is not less than the predefined threshold, the set of keys may be translated into a request to read a range of keys. In this case, loading the data from the big data store based on the one or more queries may include performing a sequential query based on a minimum row key and a maximum row key within the range of keys.

Further, in one embodiment, the method 100 may include splitting a request to multiple queries. For example, the request may be split into multiple queries based on prior knowledge of the data processing job input. As another example, the request may be split into multiple queries by algorithmically determining an optimal set of queries to be performed by heuristically approximating an amount of redundant data to be loaded balancing sequential disk reads and potential reading of redundant data and fine grained random access reads.

Accordingly, the method 100 may be utilized to implement a hybrid big data access approach that balances the need to perform sequential I/O operations for better utilizing physical disk hardware and the need to perform fine grained disk reads/writes. For a given data processing task, an algorithm may determine the optimal approach for loading the input data for the task by performing one or both of: reading large chunks of data sequentially from disk, optionally ignoring irrelevant data for the given task; and/or performing random access operations to load the specific items from disk.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
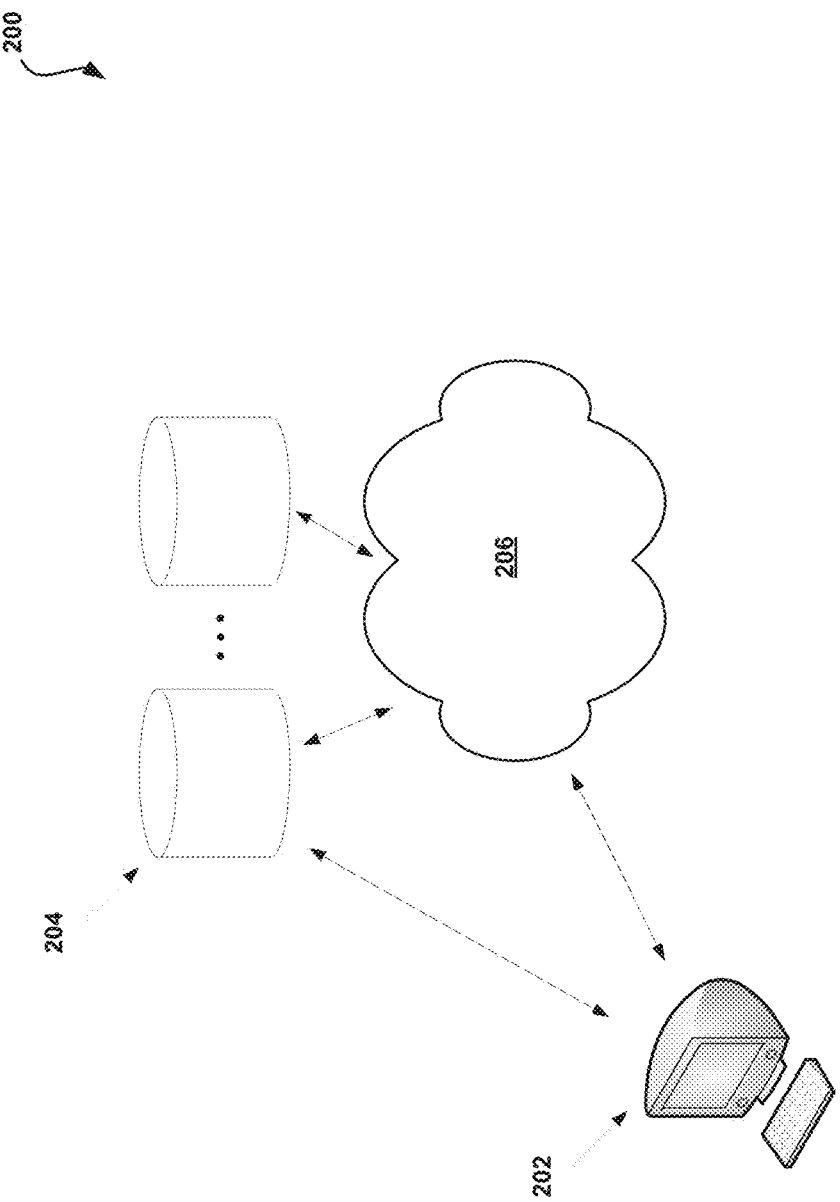
FIG. 2 illustrates a system for accessing data on a big data platform, in accordance with one embodiment.

FIG. 2 illustrates a system 200 for accessing data on a big data platform, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown, the system 200 includes a user system 202 that may access a big data store 204, which may include a plurality of storage devices. As an option, the user system 202 may access the big data store 204 over one or more networks 206.

In use, the system 200 may function to allow an approach for loading data from the big data store 204 given an input data set. The data in the big data store 204 is stored in multiple rows each having a unique key. Rows may be stored on a disk sorted by their key thus implying that adjacent rows will typically be placed on same physical disk blocks.

The data store 204 supports both key based random access to individual rows, as well as range based retrieval (sequential read) of rows given a start/end row keys.

In operation, a data processing job may receive as an input a set of keys required to be read for processing and translate this set to a set of queries to the data store. A query may include a request to read an individual key and/or a range of keys.

In the case the query includes a range, redundant data may be read as part of the loading process. Accordingly, in one embodiment, an efficient filtering mechanism based on an in memory cache may be utilized to filter out these redundant rows before further processing.

One algorithm for translating an input data set to a set of queries may function such that if the number of input rows is less than a threshold, individual random access queries are performed. Otherwise, the algorithm may dictate that a sequential query is performed based on a min, max row keys within the range.

In one embodiment, a more sophisticated algorithm may be utilized for splitting a request into multiple queries, either using prior knowledge of the input data set or by algorithmically determining an optimal set of queries to be performed by heuristically approximating the amount of redundant data to be loaded.

Prior approaches to big data access have been focused on pure sequential disk reads with no filtering, limiting the ability to perform fine grained data updates, or alternatively were performing pure random access at read time.

Figure 3:
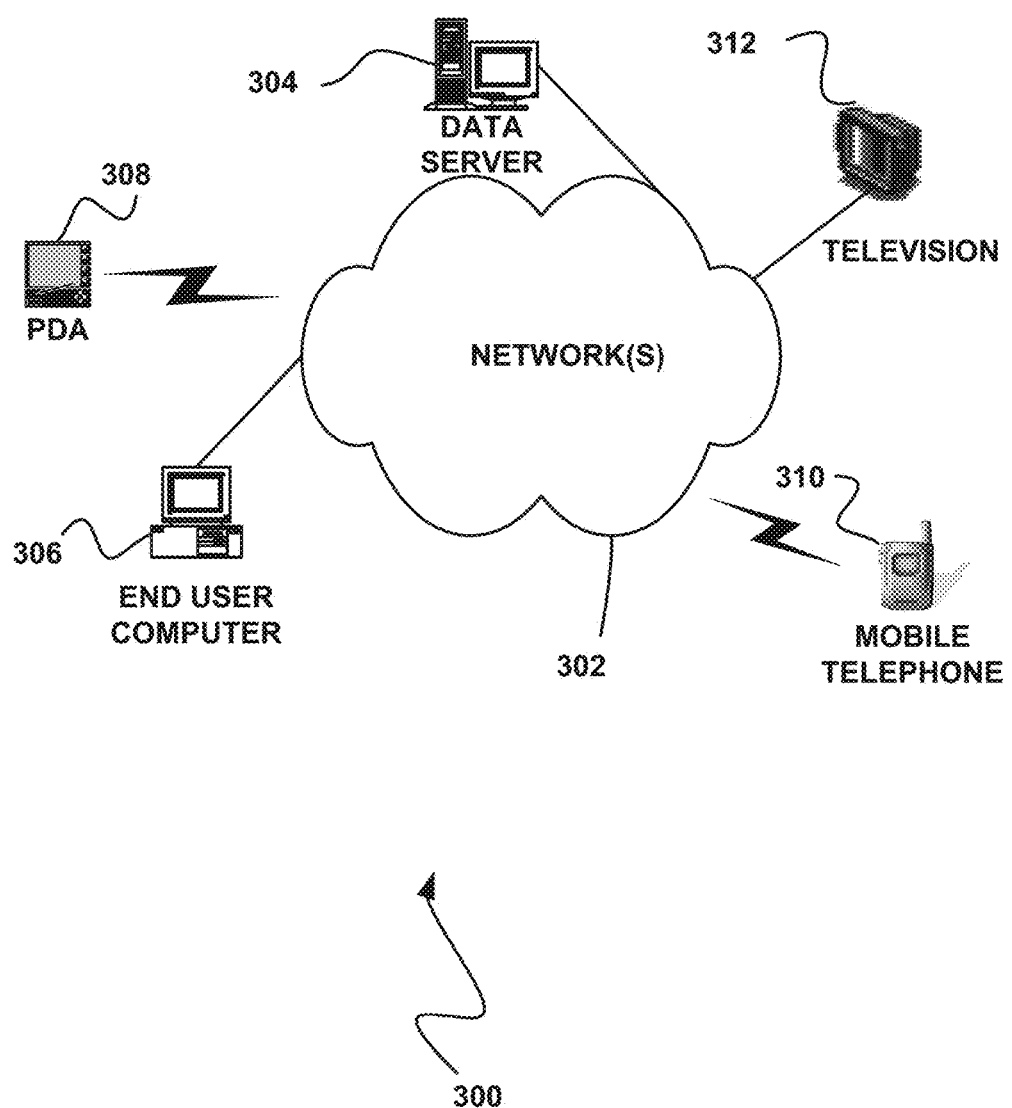
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
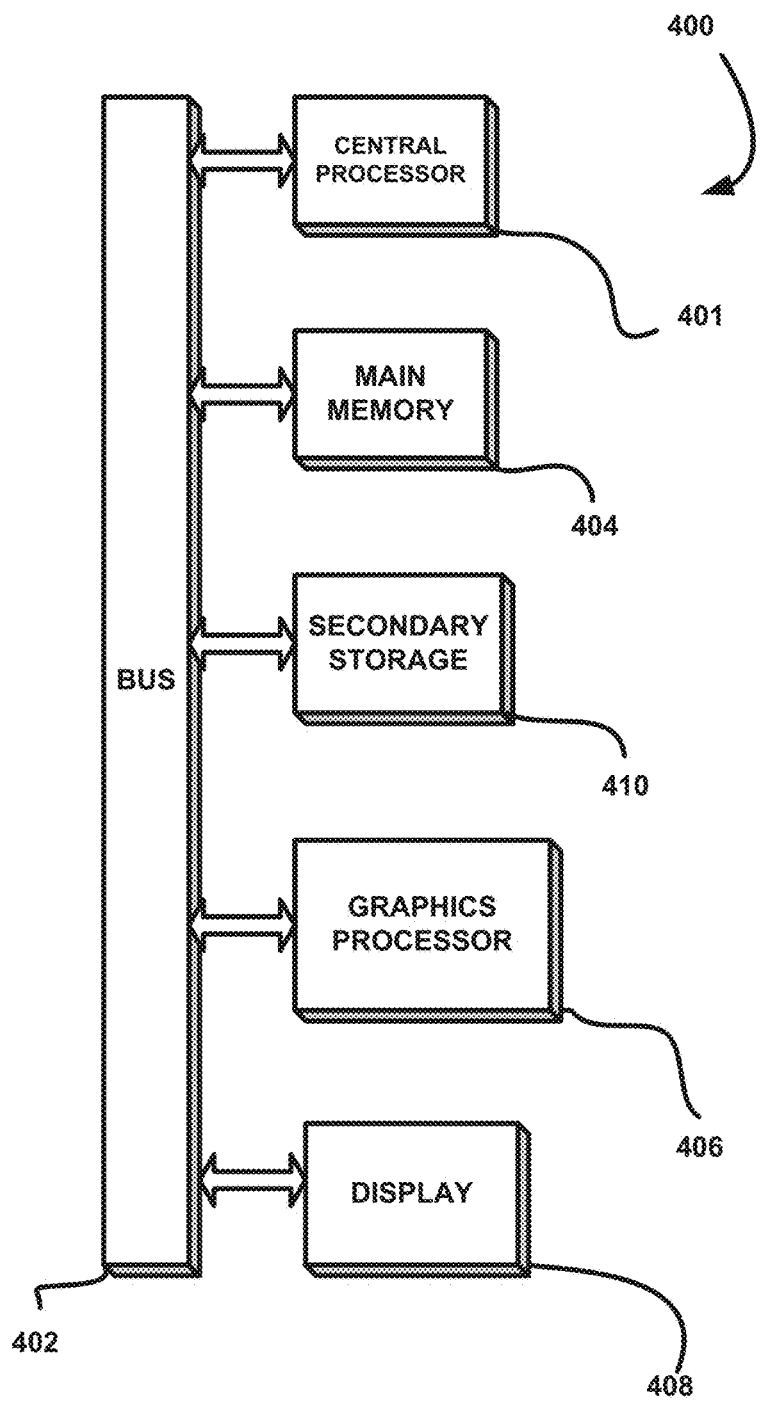
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 also includes a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying, by a computer processor, a request associated with a data processing job to process data stored in a big data store, the data being stored in a plurality of rows with each row being associated with a unique key, and the big data store supporting both key based random access to individual rows and range based retrieval of rows given a start row key and an end row key;
    receiving, by the computer processor, a data processing job input associated with the request, the data processing job input including a set of keys required to be read for processing;
    translating, by the computer processor using an algorithm, the set of keys into one or more queries to the big data store, the one or more queries including a request to read an individual key and a request to read a range of keys;
    loading, by the computer processor to the data processing job, the data from the big data store by executing the one or more queries; and
    responsive to loading the data to the data processing job, processing, by the computer processor, the data by the data processing job.

2. The method of claim 1, further comprising splitting the request into multiple queries based on prior knowledge of the data processing job input.

3. The method of claim 1, further comprising splitting the request into multiple queries by algorithmically determining an optimal set of queries to be performed by heuristically approximating an amount of redundant data to be loaded, balancing sequential disk reads and potential reading of redundant data and fine grained random access reads.

4. The method of claim 1, wherein the big data store includes a plurality of hard drives directly connected to a plurality of host systems.

5. The method of claim 1, wherein the plurality of rows are stored on one or more disks sorted by an associated unique key with adjacent rows placed on common physical disk blocks.

6. A computer program product embodied on a non-transitory computer readable medium, comprising:
  computer code for identifying, by a computer processor, a request associated with a data processing job to process data stored in a big data store, the data being stored in a plurality of rows with each row being associated with a unique key, and the big data store supporting both key based random access to individual rows and range based retrieval of rows given a start row key and an end row key;
  computer code for receiving, by a computer processor, a data processing job input associated with the request, the data processing job input including a set of keys required to be read for processing;
  computer code for translating, by a computer processor using an algorithm, the set of keys into one or more queries to the big data store, the one or more queries including a request to read an individual key and a request to read a range of keys;
  computer code for loading, by a computer processor to the data processing job, the data from the big data store by executing the one or more queries; and
  responsive to loading the data to the data processing job, processing, by the computer processor, the data by the data processing job.

7. The computer program product of claim 6, further comprising computer code for splitting the request into multiple queries based on prior knowledge of the data processing job input.

8. The computer program product of claim 6, further comprising computer code for splitting the request into multiple queries by algorithmically determining an optimal set of queries to be performed by heuristically approximating an amount of redundant data to be loaded balancing sequential disk reads and potential reading of redundant data and fine grained random access reads.

9. The computer program product of claim 6, wherein the computer program product is operable such that the big data store includes a plurality of hard drives directly connected to a plurality of host systems.

10. The computer program product of claim 6, wherein the computer program product is operable such that the plurality of rows are stored on one or more disks sorted by an associated unique key with adjacent rows placed on common physical disk blocks.

11. A system comprising:
  a memory system; and
  one or more processing cores coupled to the memory system and that are each configured to:
  identify a request associated with a data processing job to process data stored in a big data store, the data being stored in a plurality of rows with each row being associated with a unique key, and the big data store supporting both key based random access to individual rows and range based retrieval of rows given a start row key and an end row key;
  receive a data processing job input associated with the request, the data processing job input including a set of keys required to be read for processing;
  translate, using an algorithm, the set of keys into one or more queries to the big data store, the one or more queries including a request to read an individual key and a request to read a range of keys;
  load, to the data processing job, the data from the big data store by executing the one or more queries; and
  responsive to loading the data to the data processing job, process the data by the data processing job.

\* \* \* \* \*